INVENTOR.
Otto E. Hintz

UNITED STATES PATENT OFFICE 2,682,743

HARVESTER PICKUP

Otto E. Hintz, Riverside, Ill., assignor to International Harvester Company, a corporation of New Jersey Application March 17, 1952, Serial No. 277,003

20 Claims. (Cl. 56—364)

This invention relates to harvesters and more particularly to a novel pick-up therefor.

A general object of the invention is to devise a wide-swath pick-up providing simple, effective and durable means for bunching the crop toward the center of the pick-up and discharging it into a narrow throat located centrally at the rear thereof.

A more specific object of the invention is to devise a gatherer incorporating a revolvable drum within a plurality of enveloping stripper bars, the drum including outstanding tines interdigitating with the bars and the bars at opposite extremes of the pick-up being contoured to impose a lateral force component on the crop which is being swept therealong so as to shift it from opposite ends of the pick-up to the center thereof in alignment with the narrow throat at the back end of the pick-up.

A further object is to design a pick-up wherein the condensed means are static members in the form of specially contoured stripper bars.

Another object is to provide a relatively inexpensive self-stripping pick-up wherein the stripper bars are developed as spiral segments, the crop-engaging outer contours of which lie in planes intersecting the circular paths of the tines or fingers of the pick-up drum, whereby the tines as they orbit about the axis of the drum are caused to emerge and disappear with respect to the stripper bars in predetermined areas and wherein the end groups or condensing strippers at opposite extremes of the pick-up are angled inwardly toward the center of the pick-up for guiding the crop thereto.

An additional object is to develop the curvature of the condenser stripper bars in a manner to obtain an effective lateral force component on the crop and at the same time control the disappearance of the fingers through the bars to eliminate interference thereby to the lateral movement of the crop.

A still further object is to design such a mechanism wherein the length of the sweep of the endmost sets of fingers at opposite ends of the pick-up is least and that of each successive set inwardly thereof progressively increased whereby each set picks and kicks the crop up along the related condenser strippers with sufficient momentum to slide the crop laterally to the next set inwardly thereof and so forth until it is deposited on the center group of fingers which sweep directly into the throat.

Another object is to mount and arrange the condensing strippers in such manner as to substantially eliminate pinching or dead areas.

A still further object is to provide outstanding laterally projecting deflector tabs on the trailing ends of the condensing strippers, each tab being angled rearwardly toward the center of the pick-up and overlapping the tab on the trailing end of the condensing stripper disposed inwardly thereof, the tabs functioning as an additional guide for any material which may be thrown up thereagainst so as to progress it toward the center of the pick-up.

Another object is to provide a novel combination compressor and overload compensator assembly above the overshot pick-up and functioning to load the crop against the strippers to urge the same downwardly on the tapered surfaces at opposite ends of the pick-up toward the center.

A further object is to mount the tamper and overload compensator assembly so that it is movable in a manner to accept the overload and responsive thereto to simultaneously move in a direction urging rearwardly the crop increment ahead of the overload.

A still further object is to design a compensator which will tend to spread the overload bunching of crops as it is progressed toward the rear discharge end of the pick-up.

These and other objects of the invention will become more apparent from the specification and the drawings, wherein.

Figure 1:
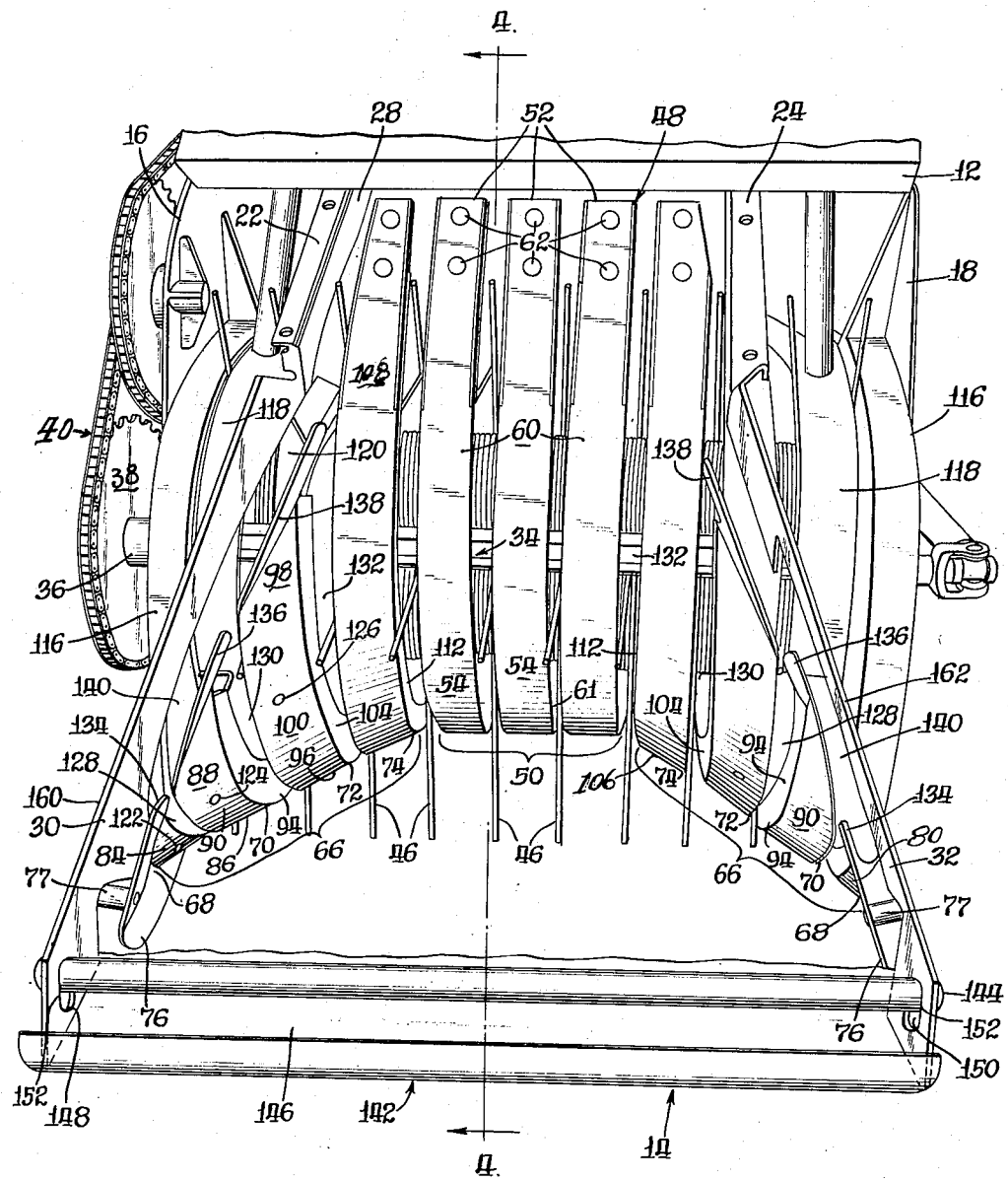
Figure 1 is a fragmentary top perspective view of the novel pick-up looking from the forward side thereof, the overload compensator broken away to clarify the illustration.
Figure 2:
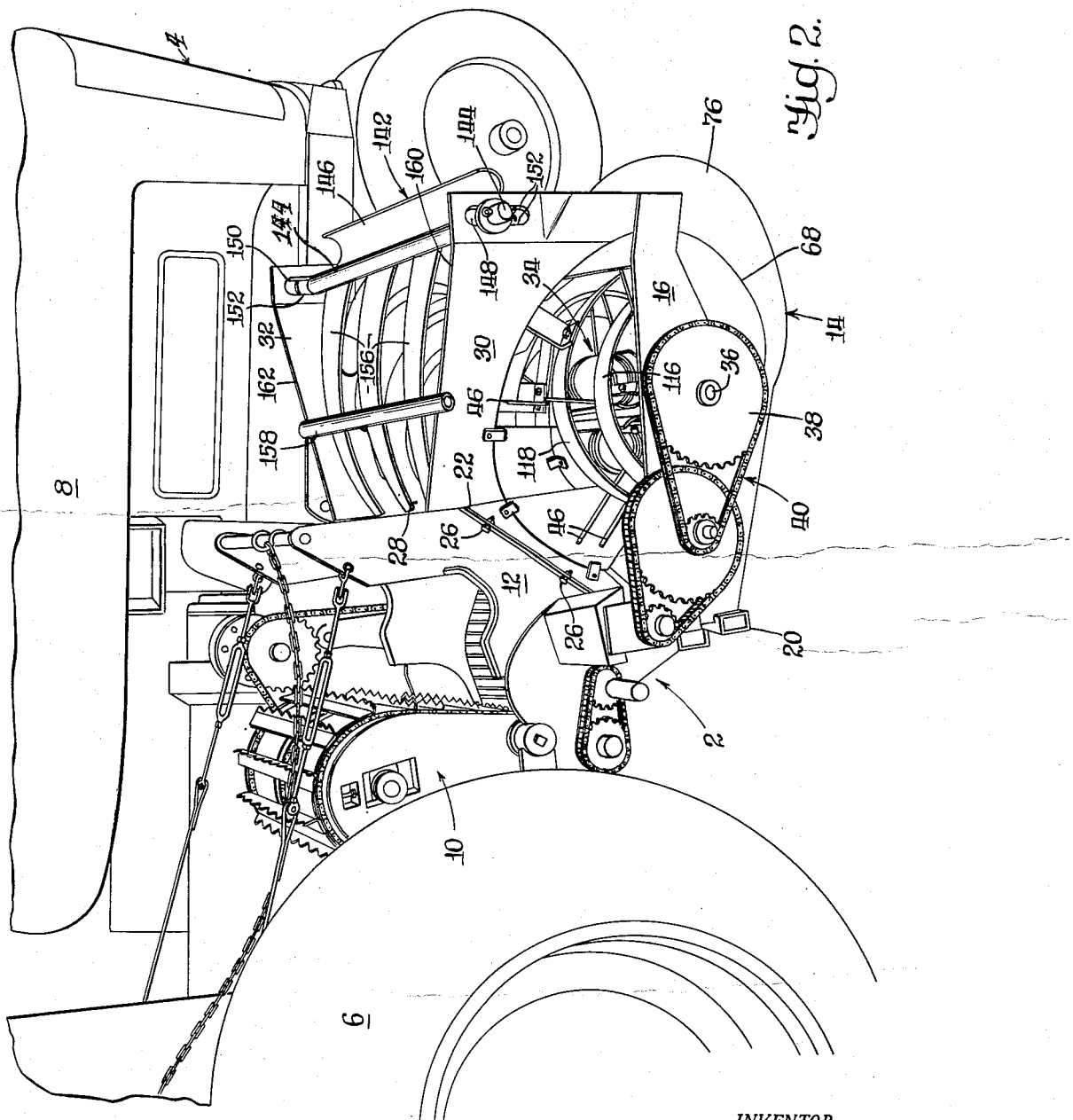
Figure 2 is a side perspective view of a harvester incorporating the novel pick-up and shown mounted upon a tractor.

Describing the invention in detail, the harvester generally designated 2 may be mounted from a rear axle housing of a conventional tractor 4 between a laterally spaced wheel 6 thereof and the body 8. The harvester may include a processing section 10 such as described in my copending U. S. application for Stalk Crop Harvester, Serial No. 213,398, filed March 1, 1951, now Patent No. 2,634,569.

A field-traversing mounting or support framework 12 is provided at the forward end of the section 10 to which is connected a novel overshot pick-up or gatherer conveyor 14.

The pick-up 14 includes a pair of laterally spaced side members 16 and 18 connected at their rear extremities to opposite ends of a cross beam 20 which inwardly of its ends is connected to the lower ends of upstanding angles 22 and 24. The beam 20 and angles 22 and 24 constitute a mounting structure for connection to the framework 12 as by bolts 26, 26.

The angles 22 and 24 form the lateral outlines of a narrow throat 28 centered with respect to the pick-up. The angles 22 and 24 connect to or may be integral with the rear ends of upstanding forwardly diverging side panels 30 and 32 disposed at opposite ends of the pick-up and forming part of the support, the forward extremity of panel 30 being connected to the forward end of side member 16 and the forward end of panel 32 being secured to the forward end of side member 18.

A reel or drum 34 is positioned between the side members 16 and 18 and comprises a center shaft 36 forming a transverse substantially horizontal axis of rotation for the drum. The shaft 36 is journaled adjacent each end on the support structure, namely, the members 16 and 18, and at one end is keyed with a sprocket 38 driven by a chain and gearing system 40 from a side power take-off shaft 42 of the tractor. The rotation of the reel is in the direction whereby the forward side of the reel sweeps upwardly as shown by the arrow in Fig. 4. The shaft 42 mounts a spider arrangement 44, Fig. 4, which are secured axially spaced annular sets of fingers 46, 46, corresponding fingers of said sets being disposed in substantially axial rows.

Figure 4:
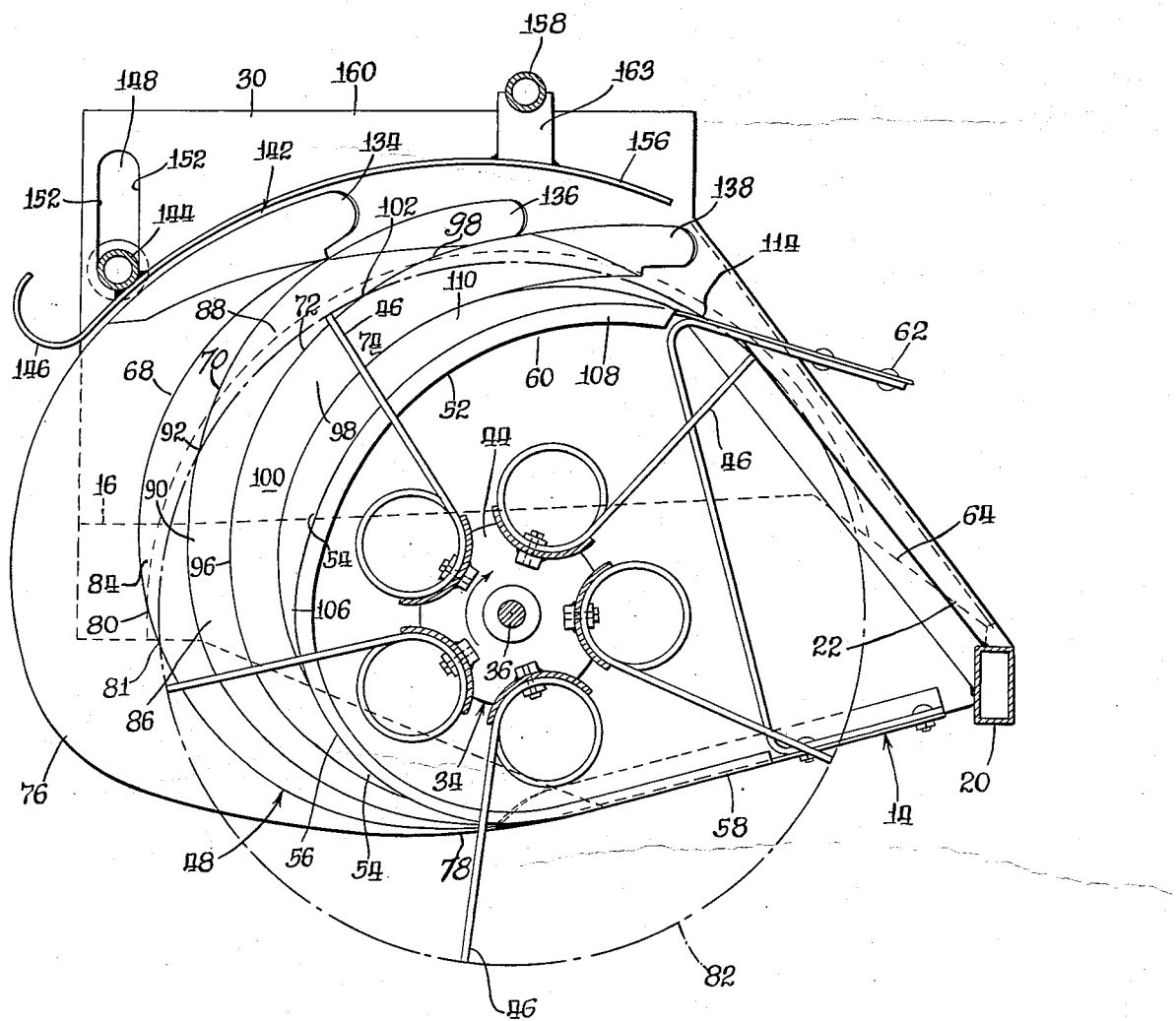
Figure 4 is a transverse vertical sectional view taken substantially on the line 4—4 of Figure 1.

The reel is enveloped by a stripper assembly generally designated 48 (Fig. 1) which includes a center section 50, comprising a plurality of side by side laterally spaced substantially identical crop support elements or stripper bars 52 in alignment transversely of the pick-up with the throat 28 disposed at the rear of the pick-up. Each bar 52 presents an outer or external crop-engaging surface 54 which extends widthwise axially of the reel and each bar 52 includes a forward or leading arcuate substantially spiral section 56 (Fig. 4). The lower end of the section 56 terminates in a rearwardly upwardly inclined substantially straight bottom portion 58 extending chordally with respect to the axis of the reel and at its rear extremity suitably anchored to the cross-beam 20. The upper portion 60 of each bar 52 is continued as a spiral and at its rear extremity is connected as by rivets 62 to the upper end of an upstanding support 64 preferably weld mounted at its lower end on the cross-beam 20.

Figure 5:
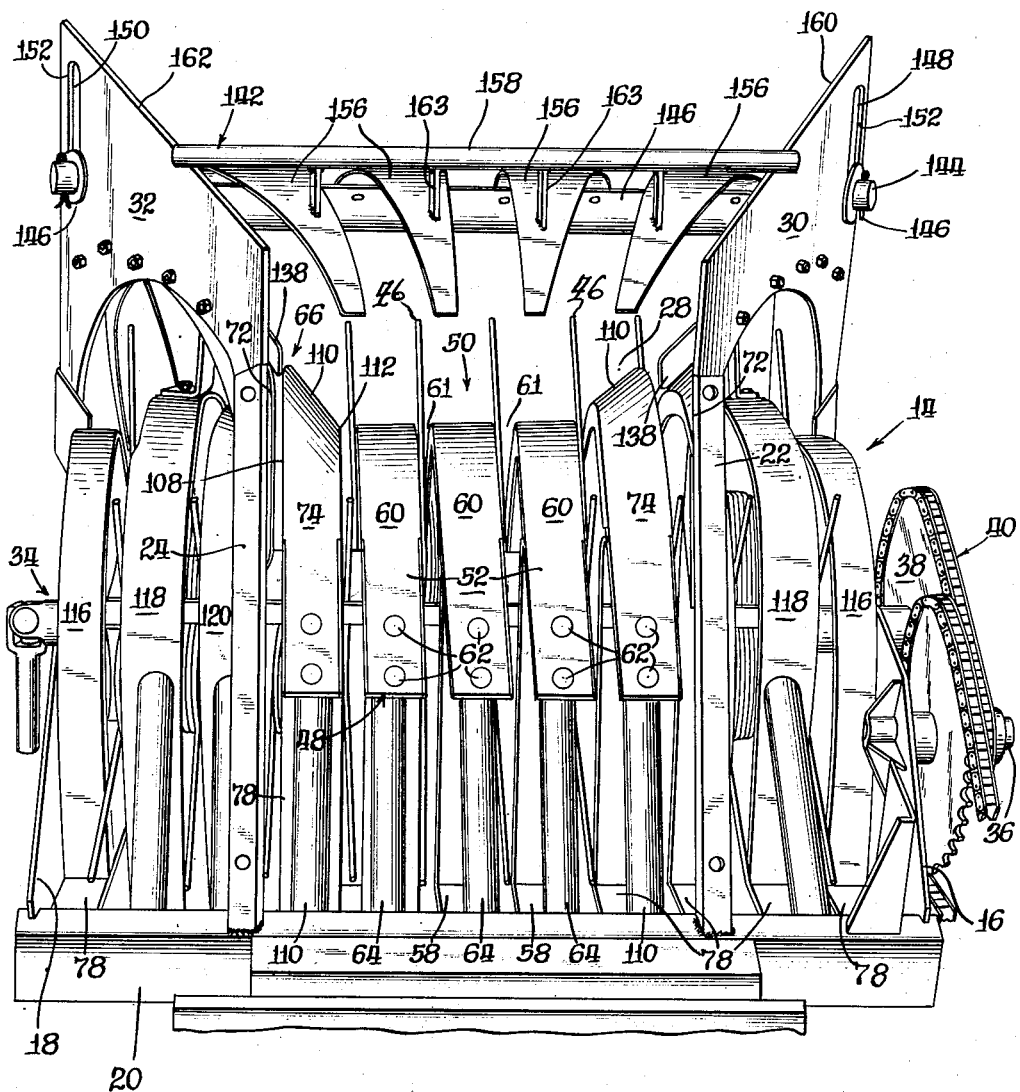
Figure 5 is a rear perspective view of the pickup.

It will be observed that the lower extremity of each bar 52 is located well within the radius of the fingers of the reel 34 and that the curvature of the sections 56 and 60 initiates adjacent to the axis of the drum within the periphery of the fingers and gradually recedes away from the axis in the direction of rotation of the drum beyond the periphery of the fingers. Such disposition of the strippers permits the related sets of fingers to interdigitate therewith and sequentially emerge through the bottom of the stripper assembly through slots 61, 61 (Fig. 5) between the strippers, then sweep in an arc about the axis through the forward sections 56 and along the top sections 60 of the strippers and then simultaneously disappear through said strippers adjacent to the trailing ends thereof.

Figure 3:
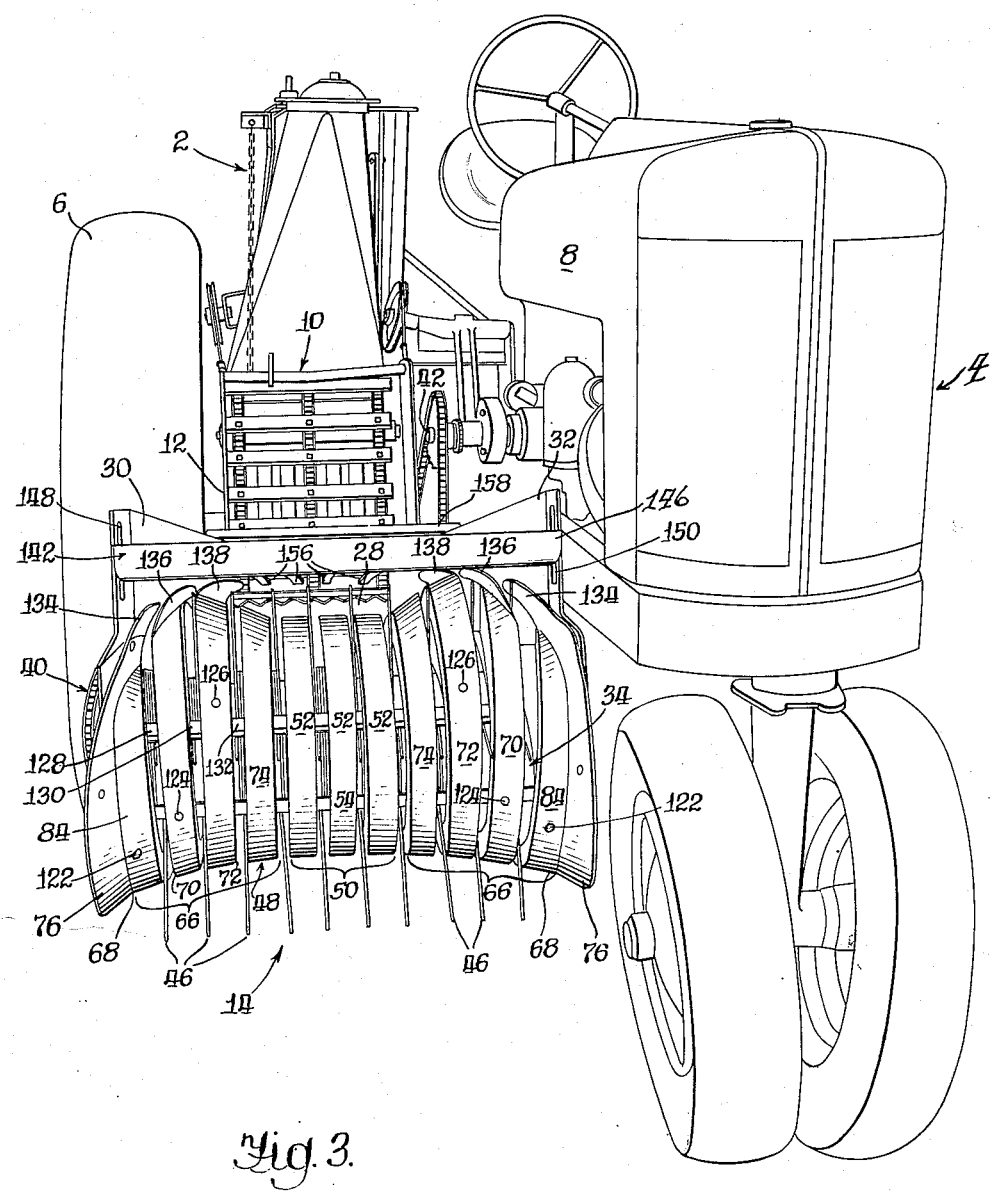
Figure 3 is a perspective front view of Figure 2.

The pick-up is further characterized by end groups of condensing strippers or stripper bars generally designated 66, 66 (Figs. 1 and 3) and located at opposite ends of the pick-up, the groups being substantially identical and each group comprising a series of several stripper bars 68, 70, 72 and 74 arranged in echelon formation with the first, leading or endmost bar 68 having a forward diagonal laterally outwardly projecting flange 76 at its outboard edge, the flange 76 being secured by a standoff mounting 77 to the inward or inboard sides of the forward extremities of the related panel 30 and side member 16 or panel 32 and side member 18. Each condenser stripper has a bottom segment or section 78 (Figs. 4 and 5) substantially coplanar with the segments 58 of the center strippers and secured at its rear extremity to the cross-beam 20 preferably as by welding. The bottom or leading end of the forward section 80 (Fig. 4) of each endmost bar 68 extends from the forward end of the related bottom segment 78 at an area within the periphery of the path of the outermost ends of the fingers of the related end set and the bar 68 curves transversely progressively abruptly away from the reel in a generally spiral arc which intercepts intermediate its ends as at 81 the peripheral path 82, shown in phantom lines in Fig. 4, of the outermost ends of the adjacent set of fingers. The stripper 68 presents on its section 80 an external tapered or inwardly angled crop-engaging surface 84 which slopes transversely of the axis of the reel inwardly toward the center section 50.

The next condensing stripper bar 70 which is stepped rearwardly with respect to the adjacent stripper 68 has its forward or leading portion or section 86 generally spirally transversely curved and extending from the forward end of its associated bottom section 78 about the forward side of the reel in a progressively receding curve initiating within the periphery of the fingers and curving gradually away from the axis of the reel less abruptly than the stripper 68. The upper extent of section 86 is continued into an upper portion 88 in the spiral curvature rearwardly over the reel. The forward and top sections of the stripper 70 present a crop-engaging surface 90 (Figs. 1 and 4) which is substantially coplanar with surface 84 and the plane of the surface 90 intercepts or intersects as at 92 (Fig. 4) the sweeping arc or path 82 of the set of fingers operating along the inboard edge 94 (Fig. 1) of stripper 70. It will be noted that the intercept 92 is located preferably about 45° rearwardly or in trailing relationship behind the intercept 81.

The next condensing stripper 72 has a forward portion or section 96 which extends from the forward end of its related segment 78 about the forward side of the reel in a generally spiral curve progressively receding from the axis of the reel and initiating within the periphery of the fingers and curving less abruptly than the preceding stripper 70. The upper part of stripper 72 is continued as an upper portion or section 98 which extends over the reel farther rearwardly than stripper 70 which in turn extends farther rearwardly than stripper 68. The forward and top sections of stripper 72 present a crop-engaging surface 100 substantially coplanar with surfaces 84 and 90 and the plane of the surface 100 intercepts or intersects as at 102 (Fig. 4) the sweeping arc or path 82 of the set of fingers operating along the inboard edge 104 (Fig. 1) of stripper 72. The intercept 102 is preferably located about 45° rearwardly of point 92.

The next condensing stripper 74 has a forward portion or section 106 which initiates from the forward end of the related segment 78 within the periphery of the fingers and curves around the forward side of the reel and continues in an upper or top portion 108 (Figs. 1 and 5) which terminates approximately evenly with the trailing ends of the center section strippers 52 and is connected to the upper end of a support 110 (Fig. 5) which at its lower end is connected to the cross-beam 20. The generally spiral curvature of sections 106 and 108 of stripper 74 is less abrupt than that of stripper 72 disposed outboardly thereof and the sections 106 and 108 present a crop-engaging surface 110 angled similarly to surfaces 84, 90 and 100 and substantially coplanar therewith. The intercept of the plane of the surface 110 with the path 82 of the fingers operating along its inboard edge 112 (Figs. 1 and 5) may be located at 114 (Fig. 4) preferably 45° rearwardly of intercept 102 and in substantially transverse alignment with the intercept of the plane of the crop-engaging external surface 54 on the upper portion 60 of the center strippers with the outer paths 82 (Fig. 4) of the related fingers.

Thus, the endmost sets of fingers have the shortest sweeping arcs and the sweeping arc of each succeeding set inwardly of the endmost set is progressively longer and longer with the increment of increase of each succeeding set extending from the trailing end of the arc of the next adjacent preceding outer set.

The stripper members or elements 68, 70 and 72 are backed up by mounting members 116, 118 and 120 (Fig. 5) disposed within the respective stripper elements and connected at their rear ends to the cross-beam 20 and projecting forwardly therefrom and connected at their forward ends to the elements 68, 70 and 72 respectively as at 122, 124 and 126 (Fig. 1) intermediate the ends thereof. The rear ends of members 68, 70 and 72 are free and overhang the reel whereby any hay which may not disengage from the associated fingers will readily pass between the slots 128, 130 and 132 (Figs. 1 and 3) defined respectively between the members 68, 70, 72 and 74.

To prevent excessive spill over the trailing ends of strippers 68, 70 and 72, said ends are provided with outstanding deflector tabs or guide elements 134, 136 and 138 respectively, angled rearwardly toward the throat in a generally common direction with the inner or free end of tab 134 overlapping the upper edge of tab 136 and the inner or free end of tab 136 overlapping the upper edge of tab 138 and tab 138 extending over the adjacent stripper 74 and into the throat 28. The tabs generally parallel the adjacent panel 30 or 32 and are spaced laterally therefrom as shown at 140.

A further feature of the invention is the provision of a combination tamper or compressor and overload anticipator assembly generally indicated 142 and comprising a cross bar or fore support 144 at its forward end supporting a shield 146 therebelow, the shield extending between the forward extremities of the side plates 30 and 32 and the ends of the bar or guide 144 projecting into slots 148 and 150 in said plates 30 and 32, the slots being substantially vertically elongated and providing generally vertical margins or edges or guides 152 whereby the forward or leading end of the assembly is restricted to up and down and rotational movement. Outwardly of the plates the ends of the bar 144 are provided with washer and cotter key locking devices 146 for maintaining the bar in assembly with the plates.

The shield terminates a short distance rearwardly of the bar 144 and connects with the bar to the front ends of a plurality of laterally spaced upwardly bowed side by side slat irons 156, 156 which at their rear ends terminate adjacent to the throat entrance.

The rear extremities of the irons 156 are carried from a slidable pivot bar element or aft support means 158 which extends across the top generally horizontal substantially coplanar edges or margins 160 and 162 (Fig. 5) of the plates 30 and 32 adjacent to their rear extremities and provides an axis of rotation above the forward extremity of the assembly. The upwardly facing surfaces 160 and 162 are substantially preferably normal to the planes of the guide surfaces 152. The rear extremities of the slats 156 are positioned a substantial distance below the upper edges 160 and 162 of the plates by means of depending lugs 163 on the bar 158 and secured to the top sides of the respective slats 156.

In operation the gatherer or pick-up is advanced into the crop laying upon the ground as in a wide window. The drum rotates to sweep upwardly on its leading side and the construction of the condenser strippers and relationship of fingers lifts the crop onto the strippers. The endmost sets of fingers have the shortest sweeping arcs due to the convolution of the related strippers and each successive set inwardly thereof has a progressively larger sweep. This feature effects a correlation between the work each set of fingers does and its extent of sweep so that the lightest bunching is merely kicked up at the ends of the pick-up and the fingers thereof rapidly disappear so as to not interfere with the lateral moment developed on the crop by its movement along the related strippers on the inwardly converging surfaces thereof. The crop is thus shifted from the end sets of fingers to successive inner sets which progressively sweep the crop upwardly and over the top of the pick-up. The crop from each end is kicked up in steps by the respective fingers and slid over the strippers from one set to the next until it is condensed with the crop which is picked directly by the tines or fingers of the center section of the pick-up whereupon it is moved rearwardly into the narrow throat.

The crop redistributor baffle structure or compressor and load anticipator assembly 142, which is floatingly mounted, cooperates with the strippers to impose a downwardly directed force vector crop bunched therebeneath so that the crop on the condenser strippers is caused to slide toward the center. Any particles of the crop which may be shot up to the trailing ends of the condenser strippers will be deflected by the tabs toward the center and any fragment which may catch on the fingers interdigitating with the condenser strippers can push through the trailing ends thereof.

In the course of picking, the crop feeds in varying volume. To effect a gulping action the assembly 142 is caused to rotate about the axis of bar 158 to raise the front end to accept the overload and simultaneously effect movement of translation rearwardly due to the vertical guidance of the forward end of the assembly 142 to thus push the crop increment immediately therebeneath rearwardly just at the moment of overload to clear a space ahead for the overload. It will be noted that the bar 158 slides back and forth on the edges 160 and 162 and also is lifted off the edges when passing the overload beneath the rear end of assembly 142 and rotated about the axis of the forward bar 144. When the overload is cleared the front end of assembly 142 drops to the limit permitted by the lower edges of slots 148 and 150 and the cross-bar 158 comes to rest upon the upper edges 160 and 162 of the plates 30 and 32. The downward movement of the forward end of the assembly upon passing the overload bunching shifts the assembly forwardly which tends to redistribute the overbunching by spreading it out. It will be understood that these movements of rotation and translation of the assembly 142 take place with rapidity and develop moments of inertia which help to scatter the crop.

What is claimed is:

1. In an overshot pick-up for cut hay and the like, a portable mounting structure, a rotatable reel journaled thereon on a substantial horizontal axis and having a plurality of axially spaced sets of outstanding fingers with corresponding fingers of respective sets arranged in generally axial rows, a series of laterally spaced arcuate strippers including a group of condensing strippers at each end carried by the structure, said strippers enveloping said reel and arranged in interdigitating relationship with said fingers, the condensing strippers of respective groups presenting substantially coplanar crop-engaging areas forwardly and above the reel angle laterally toward the center of the pick-up, all of said strippers receding from said axis in the direction of rotation of the reel and positioned at a distance therefrom sufficient to permit said fingers to pass outwardly therebetween in the region of the lower edge of their forward sides and while moving toward the trailing ends of said strippers to gradually disappear therebetween, the curvature of the endmost condensing strippers being most abrupt away from said axis and of each succeeding condensing stripper progressively less abrupt whereby corresponding fingers of the sets cooperating with the condensing strippers are caused to disappear sequentially initiating with those of the endmost sets whereby to minimize interference to lateral shifting of the crop.

2. In a field implement, a portable support, a reel rotatably mounted thereon and including axially spaced outstanding fingers, said reel rotated to sweep upwardly on its forward side, a plurality of strippers arranged in echelon formation carried by the support encompassing said reel and disposed in interdigitating relationship with said fingers, said strippers being angled laterally in a common direction transversely to the axis of the reel and developing a substantially coplanar crop-engaging leading surface area, the forwardmost stripper of said formation curving most abruptly away from the axis of rotation of the reel and each succeeding stripper progressively curving less abruptly than the preceding, said forwardmost stripper intercepting the shortest sweeping arc of the fingers and each succeeding stripper intercepting a proportionately longer sweeping arc.

3. A field implement according to claim 2 wherein each stripper from the forwardmost to rearwardmost is formed and arranged so that the increment of increased length of each succeeding finger sweeping arc initiating from said forwardmost stripper extends in a trailing direction with respect to the next preceding arc.

4. A wide-swatch pick-up mechanism for narrow throat harvesting machines comprising a frame, a reel rotatably mounted on the frame, material-supporting flat-surfaces elements fixed to the frame and extending in laterally spaced relationship about the reel, each of said material-supporting elements including a curved front portion and an upper rearwardly extending portion gradually receding from the reel, certain of said elements being aligned with the throat and fixedly secured at their rear ends to the frame and the remaining elements having their trailing ends freely overhanging the reel, said remaining elements having their front and upper portions angled laterally rearwardly and downwardly respectively toward said certain elements to provide diagonal surfaces sloping thereto.

5. A pick-up according to claim 4 and comprising upstanding deflector tabs on the trailing ends of said remaining elements angled rearwardly toward the throat.

6. A wide-swatch pick-up device for gathering material and delivering the gathered material into a narrow material-receiving portion on a portable frame comprising a reel rotatably mounted on a frame in front of said portion and including a plurality of axially spaced sets of outstanding fingers, laterally spaced crop supporting elements disposed about said reel carried on the frame and defining slots therebetween for the passage of the fingers, the elements at opposite ends of said pick-up being curved farthest from the axis of rotation of the reel and each succeeding element inwardly thereof being similarly curved but spaced closer to said axis in intersecting relationship to the path of the adjacent fingers whereby said elements from said ends toward the center of the pick-up intercept progressively larger sweeping arcs of respective fingers.

7. In a pick-up, the combination of a rotatable drum, a plurality of axially spaced pick-up fingers extending from the drum and secured thereto, stationary slotted stripper means extending from a region adjacent the drum in a curve of gradually increasing radius away from the drum, the curve initiating from a radius less than that to the outer extremities of the fingers and the slots in said stripper means being disposed for the passage of said fingers, and said curve being so chosen as to progressively intercept at circumferentially spaced points in sequence from the opposite ends toward the center section of the drum during predetermined rotation of the drum, the paths of the outer extremities of corresponding fingers, the areas of said stripper means adjacent opposite ends thereof being angled toward the center section of said stripper means.

8. A stripper assembly for a device of the class described comprising a frame, a plurality of laterally spaced arcuate stripper bars mounted on the frame about a common axis, the stripper bars at the center section of said assembly having a substantially common contour and all of said stripper bars extending from a region adjacent said axis in a curve of gradually increasing radius away from the axis, the stripper bars at the end sections of said assembly being arranged in echelon formation with the end stripper bars farthest from said axis and each succeeding stripper bar closer to the axis, said stripper bars of the end sections being laterally angled toward said center section.

9. A stripper assembly for a device of the class described having at least one section comprising a plurality of stationary stripper bars mounted on an associated support about a common axis, said bars formed with generally flat crop engaging faces and arranged in substantially echelon formation and including a first stripper bar, each bar extending from its leading to its trailing ends in a curve initiating at the leading end adjacent to said axis and progressively receding therefrom toward the trailing end, the curvature away from said axis of each succeeding bar from the first thereof being progressively less sharp than the preceding, said crop engaging faces being angled in a common direction toward said axis.

10. A condensing stripper comprising a flat-faced bar curved transversely substantially as a spiral segment, the face of the bar being angled toward the axis of curvature of the bar.

11. A stripper element having leading and trailing ends and comprising a crop-engaging surface between said ends, and a deflector member projecting from said surface adjacent to said trailing end and providing a guide face intersecting said surface.

12. A pick-up comprising a support, a rotatable reel mounted thereon and provided with outstanding fingers, a plurality of stripper bars carried by the support encompassing said reel and arranged in interdigitating relationship with said fingers, the stripper bars at opposite ends of the pick-up being substantially coplanar and angled toward the center section of the pick-up to provide inwardly converging surfaces adapted to impose a lateral force component upon the crops moved therealong by the associated fingers operating through the respective stripper bars for shifting the crop onto and toward the center section of the pick-up, a combination tamper and overload compensator assembly overlying said pick-up, means including slidable pivotal means supporting said assembly adjacent to the rear end thereof on a generally horizontal transverse axis located above the assembly, said slidable pivotal means movable longitudinally with respect to the line of draft of said pick-up, said assembly being movable about said slidable pivotal means toward said pick-up against the crops piled between the same and said stripper bars and effective to impose a load upon the crops at opposite ends of the pick-up to move the same laterally to the center section of the pick-up in cooperation with the angled stripper bars therebeneath, and guide means carried by the support and associated with the forward end of the assembly for limiting said forward end to substantially up and down movements, said guide means and slidable pivotal means effective immediately upon overbunching of crops between the forward end of the assembly and the pick-up to permit said forward end of the assembly to move substantially upwardly away from said pick-up while simultaneously all other portions of the assembly while pivoting about said slidable pivotal means are caused to shift rearwardly whereby concomitantly rearwardly shifting the underlying crops engaged thereby to clear the crop increment ahead of the overload.

13. In a crop gathering mechanism, a frame structure, an overshot pick-up carried thereby, a tamper and overload compensator assembly movably mounted above the pick-up from said structure and movable at its leading end substantially up and down only and back of its leading end movable simultaneously upwardly and rearwardly whereby rearwardly propelling the crops engaged between the pick-up and assembly while the leading end is being lifted by an overload.

14. In a crop gathering mechanism, a frame structure, an overshot pick-up carried thereby, said structure including a pair of upstanding laterally spaced panels extending upwardly from opposite ends of said pick-up, a tamper and overload compensator assembly positioned above the pick-up, a supporting guide member connected to the leading end of said assembly and extending at each end into substantially vertically elongated guide slots in respective panels whereby the leading end is restricted to substantially up and down movements, a pivot support connected to the rear extremity of said assembly and extending across the upper margins of said plates, said margins disposed at a higher level than said slots so that in normal position said assembly is inclined downwardly forwardly whereby upon an overload of crops entering between the forward end of the assembly and said pick-up, said forward end is elevated by rotation about said pivot support and simultaneously the portions of the assembly rearwardly of the guide member are shifted rearwardly by said guide member moving substantially vertically in said slot.

15. The combination according to claim 14 wherein said assembly includes a plurality of longitudinal crop engaging elements extended between said guide member and pivot support, and depending means on said pivot support suspending the rear ends of said elements therebelow adjacent to said pick-up.

16. In a harvester for cut hay and the like comprising a field-traversing support, a pick-up carried thereby in gathering relationship to the cut hay, and compressor means floatingly mounted on the support in cooperative relationship with the pick-up and having motion of rotation and translation transversely of the pick-up.

17. Compressor means comprising forward transverse guide means, slat elements extending transversely of the guide means and having one of their ends connected thereto, and support means for the opposite ends of said slat elements and connected thereto.

18. The combination with a conveyor having a crop-carrying surface, means for moving crops along the surface in varying bunches, and compressor means disposed in opposing relationship to said surface whereby the crops are caused to pass therebetween and comprising a crop-engaging structure guidably supported at its leading end for movement to and fro with respect to said surface upon engagement with bunches of predetermined dimensions, and support means guidably supporting said structure aft of said leading end for movement of rotation about an axis generally parallel to the plane of movement of its leading end, said support means movable transversely to said plane in response to movement of said leading end.

19. The combination with a conveyor having an upwardly facing crop-carrying surface, means for moving crops along said surface, a crop-engaging structure spaced above the surface in opposing relationship thereto, means supporting the leading end of the structure and guiding its movements in a predetermined plane to and fro with respect to said crop-carrying surface, said support means presenting an upwardly facing bearing surface substantially normal to said plane and at a level normally higher than said leading end, and a support pivot element connected to said structure adjacent to the aft end thereof and slidably and rotatably seated upon said bearing surface.

20. The combination with a conveyor including an upwardly facing material-carrying surface and a pair of upwardly extending panels flanking the surface, means for moving the material in varying bunches between said panels along said surface, a baffle structure spaced above said surface in opposing relationship thereto and engageable with bunches of material of over a predetermined height, said structure having a transverse round bar at its leading end extending at its ends into vertically elongated slots in respective panels, the slot limiting movement of the bar and thus the leading end of the structure within a predetermined substantially vertical plane, said panels presenting generally coplanar surfaces at their upper edges extending angularly to said plane, and a tubular-like support element connected to said structure aft of its leading end and straddling said upper edges of the panels.

References Cited in the file of this patent

UNITED STATES PATENTS

| Number | Name | Date |
|---|---|---|
| 1,505,928 | Buck et al. | Aug. 19, 1924 |
| 2,439,259 | McCormack | Apr. 6, 1948 |
| 2,464,684 | Hill | Mar. 15, 1949 |
| 2,571,489 | Russell | Oct. 16, 1951 |